United States Patent [19]

Johnston

[11] 4,144,043

[45] Mar. 13, 1979

[54] THREE-STAGE DUST COLLECTOR

[75] Inventor: Gordon L. Johnston, Maple Grove, Minn.

[73] Assignee: Donaldson Company, Inc., Minneapolis, Minn.

[21] Appl. No.: 805,986

[22] Filed: Jun. 13, 1977

[51] Int. Cl.² .......................... B01D 50/00; E21C 7/00
[52] U.S. Cl. ......................................... 55/319; 55/321; 55/337; 55/385 D; 55/457; 55/348; 209/144; 210/512 M; 175/206
[58] Field of Search ................. 55/319, 321, 325, 330, 55/337, 385 D, 456, 457, 459 R, 346, 347, 348; 209/144, 211; 210/512 R, 512 M; 175/66, 206, 209

[56] References Cited

U.S. PATENT DOCUMENTS

| | | | |
|---|---|---|---|
| 1,761,627 | 6/1930 | Hine | 55/459 R |
| 2,804,169 | 8/1957 | Olah | 55/457 |
| 2,887,177 | 5/1959 | Mund et al. | 55/337 |
| 2,889,008 | 6/1959 | Copp et al. | 55/348 |
| 3,387,889 | 6/1968 | Ziemba et al. | 299/12 |
| 3,498,461 | 3/1970 | Miller | 210/253 |
| 3,528,514 | 9/1970 | Sandvig | 175/49 |
| 3,695,012 | 10/1972 | Rolland | 55/337 |
| 3,915,679 | 10/1975 | Roach et al. | 55/347 |
| 4,050,913 | 9/1977 | Roach | 55/347 |

FOREIGN PATENT DOCUMENTS

| | | | |
|---|---|---|---|
| 191856 | 9/1957 | Norway | 209/144 |
| 464319 | 7/1975 | U.S.S.R. | 55/457 |

OTHER PUBLICATIONS

Donaldson Operation Manual Series RDX00-4545, Roof Drill Dust Collector, pp. 1-19, 1975, Donaldson Company, Inc., 1400 West 94th Street, Minneapolis, Minnesota.

*Primary Examiner*—Frank W. Lutter
*Assistant Examiner*—David L. Lacey
*Attorney, Agent, or Firm*—Merchant, Gould, Smith, Edell, Welter & Schmidt

[57] ABSTRACT

A three-stage dust collector incorporating a side outlet cyclone separator as the second dust collection stage. The side outlet separator includes an inlet end, an outlet end and a continuous side wall therebetween. A plurality of side outlet apertures are provided in the side wall and the separator has a plurality of axial passageways between its inlet and outlet ends. A vortex generating device is affixed within each axial passageway proximate the inlet end thereof and a device is provided for channeling clean air from within each axial passageway through a side outlet aperture. The vortex generated in the flow of dust-laden air entering the axial passageway discharges dust through the outlet end of the separator while cleaned air is channeled through the channeling device to a third stage separator.

15 Claims, 8 Drawing Figures

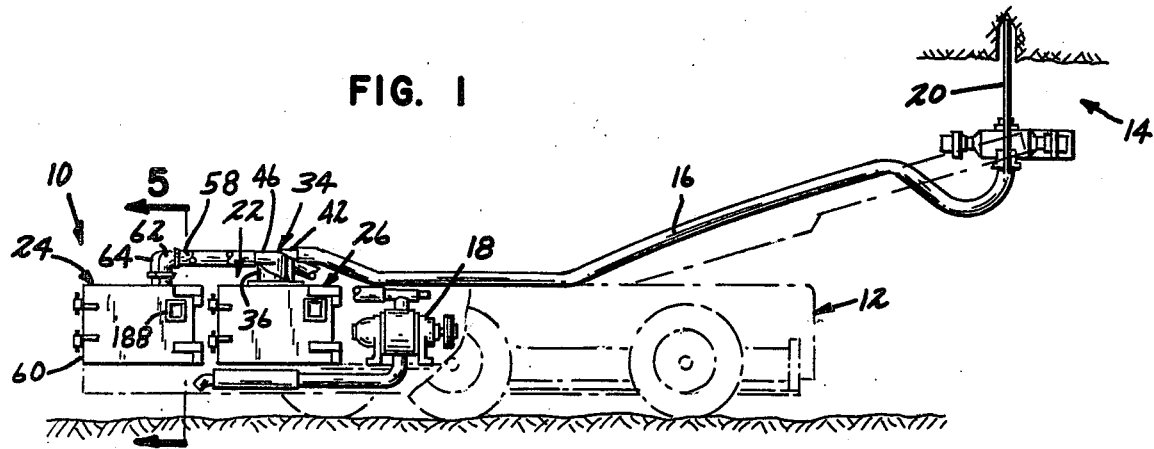
FIG. 1
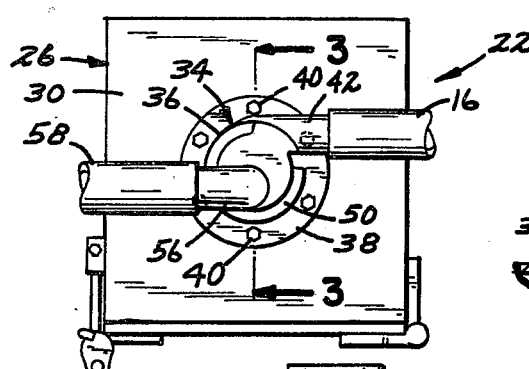
FIG. 2
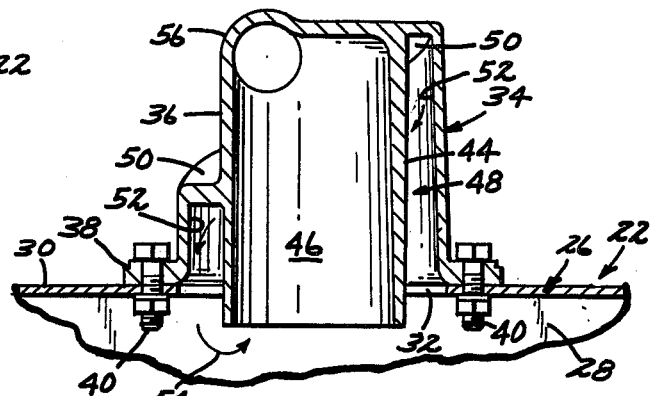
FIG. 3
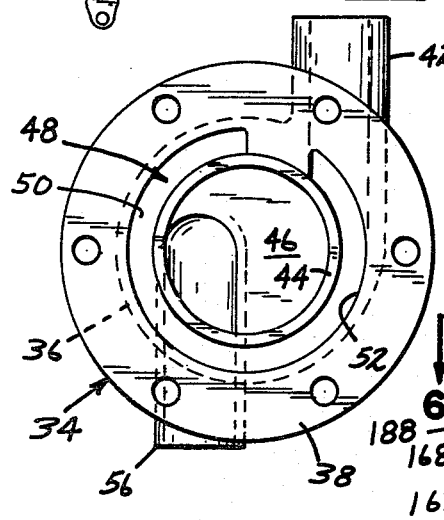
FIG. 4
FIG. 5

THREE-STAGE DUST COLLECTOR

BACKGROUND OF THE INVENTION

The present invention relates broadly to an underground mine roof drill dust collection system, and, in particular, to an improved three-stage dust collector.

In modern underground mining operations the method of supporting the mine roof by beams extending from floor to roof has been replaced by a method in which the roof is bolted to strata above the roof. Holes are drilled through the roof and into the supporting strata. Bolts are then utilized to secure the roof to the supporting strata. Large quantities of dust are generated in the roof drilling operation. It is desirable to move the generated dust from the roof drill operator environment. In addition to improving the operator environment, dust removal increases roof drill performance.

The prior art includes a three-stage roof drill dust collector developed by the assignee of the present application. This prior art three-stage collector is described in "Operation Manual for Donaldson Roof Drill Dust Collector RDX00-4545" printed by the Donaldson Company, Inc. in 1975. The prior art dust collector described in this publication includes a first stage cyclone separator, a second stage separator, and a third stage filter. The second stage separator is a DONACLONE® Separator which includes reverse-flow cyclone separator tubes. The third stage is a single filter having a heavy-duty pleated paper cartridge. The dust particles are carried to the dust separator through a hollow drill rod and hose by a vacuum blower unit.

Periodically, the roof drilling operations must be stopped while the collected dust is removed from chambers within the three-stage dust collector. Additionally, as dust collects on the paper cartridge filter element, the air flow therethrough is restricted, and, therefore, the filter must be periodically cleaned and/or replaced. These operations increase the down time of the roof drill and increase the operator maintenance functions that must be completed. It is desirable, therefore, to increase the time between such maintenance operations while maintaining high dust collection efficiency and minimizing roof drill down time.

One such solution to the above problem could be to simply increase the size of the dust collection chambers and add additional filters to the third stage of the dust collector. However, this solution has the disadvantage that the size of the unit must be increased and to increase the unit's size and also maintain the dust collection efficiency of the prior art three-stage dust collector is not cost effective. Additionally, the maximum size of the three-stage dust collector housing is limited by the fact that it must be conveniently mounted on the roof-drill vehicle.

The present invention solves the problems associated with the prior art systems in that it provides a three-stage collector having the same if not better efficiency of the prior art collector, the same size housing of the prior art collector, and which increases the length of time between periodic operator maintenance. The advantages of the present invention are achieved through the utilization of a side outlet separator as the second stage of the three-stage collector as opposed to the prior art reverse flow cyclone tubes. The broad concept of a side outlet cyclone separator is disclosed and claimed in a co-pending patent application Ser. No. 794,045, filed May 5, 1977, assigned to the assignee of the present application. The side outlet cyclone separator utilized in the present invention combines the advantages of a high flow rate and efficiency present in straight-through axial cyclone separators with the non-scavenge flow characteristics acquired in reverse flow cyclone separators. The side outlet separator requires a smaller space within the three-stage collector than the prior art reverse flow separator, and, therefore, two third-stage filters can be utilized as opposed to the single filter of the prior art dust collector, It can be seen that by utilizing two filters as opposed to one, the time between cleaning or removal of the filter elements can be increased, minimizing operator maintenance.

SUMMARY OF THE INVENTION

The present invention is a three-stage dust collector having a first stage dust separator, a third stage dust separator, and a second stage side outlet dust separator. The side outlet dust separator has an inlet end and an outlet end connected by a continuous side wall and having a longitudinal axis. A plurality of axial passageways between the inlet and outlet ends are disposed within the separator, each having axes aligned generally parallel to the longitudinal axis. Side outlet apertures are disposed within the continuous side wall intermediate the inlet and outlet ends of the separator and means are disposed within the separator for channeling clean air from the axial passageways through the side outlet aperture. Vortex generating means are affixed within the axial passageways at the inlet ends thereof such that a vortex is generated in the axial flow between inlet and outlet ends of the separator. Dust particles are thereby thrown against the inner side walls of the axial passageways and discharged through the outlet end of the separator.

In the preferred embodiment, the side outlet separator is cylindrical and the axial passageways are equiangularly spaced about the central axis of the separator. A plurality of conduit members are secured to the side outlet separator, each conduit member having an inlet end disposed within one of the axial passageways proximate the inlet end of the separator and an outlet end terminating at one of the side outlet apertures. The conduit members, therefore, define the discharge passageways for clean air. In the embodiment disclosed herein, the side outlet separator includes a pair of axial passageways disposed 180 degrees apart about the central axis of the separator and the conduit members are mounted by mounting members affixed to the side wall of the separator. In particular, the mounting members are metal pieces curved to have an inner surface which conforms to the side wall of the separator and a plurality of tabs which are received within elongated slots in the side wall. An aperture is provided in the mounting member and the conduit member is affixed to the mounting member such that the conduit outlet end extends through the aperture. The vortex generating means is preferably a plurality of helical vanes affixed to an elongated hub.

The three-stage dust collector further includes a first dust separator that is a cyclone separator having an inlet for dust-laden air, and an air outlet and a dust collection chamber. The air outlet is connected by a hose to the input conduit of a housing in which is mounted the side outlet dust separator and the third stage dust separator. The housing is divided by a plurality of partitions into a dust collection chamber, an expansion chamber, and a clean air outlet chamber. The side outlet separator is mounted in the expansion chamber such that dust is discharged from its outlet end into the dust collection chamber and clean air is discharged into the expansion chamber. The inlet end of the side outlet separator is connected to the inlet conduit of the housing. The third stage separator includes a pair of filters mounted within the expansion chamber. Each filter includes a pair of cylindrical concentric apertured walls between which is captured a pleated paper filter element. The inner wall defines an axial passageway which is closed at one end thereof and which is in fluid communication with the clean air outlet chamber. Air in the expansion chamber flows through the filters where additional dust is entrapped by the pleated paper filter element and then into the clean air outlet chamber.

The present invention, therefore, provides an improved three-stage dust collector incorporating a side outlet separator as the second dust collection stage. As previously mentioned, minimum roof drill down time is achieved in the present invention by extending the time between successive operator maintenance functions, such as replacement of and/or cleaning of the pleated filter elements and emptying of the dust collection chambers.

These and other advantages of my invention will become apparent with reference to the accompanying drawings, detailed description of the preferred embodiment, and claims.

BRIEF DESCRIPTION OF THE DRAWINGS

FIG. 1 is a view in elevation showing the three-stage dust collector of the present invention mounted on a roof drill apparatus;

FIG. 2 is a top plan view of the first-stage collector of the present invention;

FIG. 3 is an enlarged fragmentary sectional view taken along line 3—3 of FIG. 2;

FIG. 4 is an enlarged bottom plan view of the cyclone separator shown in FIG. 2 and FIG. 3;

FIG. 5 is a sectional view in elevation taken along line 5—5 of FIG. 1;

A DETAILED DESCRIPTION OF A PREFERRED EMBODIMENT

Figure 6:
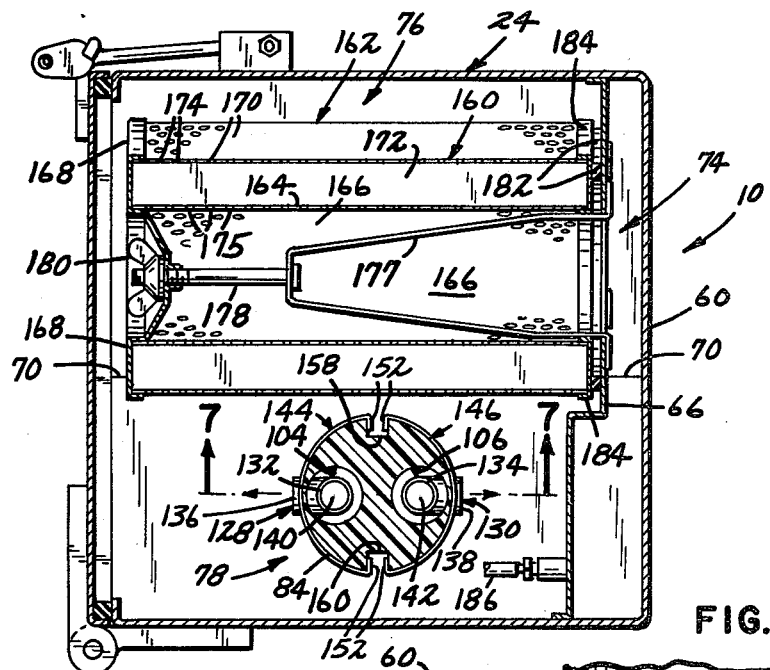
FIG. 6 is a sectional view taken along line 6—6 of FIG. 5.

Referring to the drawings, wherein like numerals represent like parts throughout the several views, there is illustrated in FIG. 1, a three-stage dust collector 10 mounted on a roof drill vehicle 12. A roof drill 14 is connected by a vacuum intake hose 16 to three-stage dust collector 10. A vacuum blower 18 is connected to three-stage dust collector 10 to pull dust-laden air therethrough from drill 14. Drill 14 is provided with a hollow drill bit 20 having an aperture therein (not shown) which collects the dust during the drilling and channels the dust-laden air to vacuum intake hose 16.

Three-stage dust collector 10 includes a first stage dust collector 22 and a second and third stage dust collector 24. First stage dust collector 22 is illustrated in more detail in FIGS. 1–3. Dust collector 22 includes a housing 26 which defines a dust collection chamber 28.

Housing 26 has a top wall 30 provided with an aperture 32. Mounted about aperture 32 is a cyclone separator 34. Cyclone separator 34 has an essentially cylindrical housing 36 with an outwardly extending flange 38. A plurality of fasteners 40 are provided to secure flange 38 to top wall 30 about aperture 32. Cyclone separator 34 has a tangential inlet conduit 42 to which is attached vacuum intake hose 16. A tubular portion 44 divides cylindrical housing 36 into an air outlet chamber 46 and an air inlet chamber 48. Cylindrical housing 36 has a helical ramp portion 50 which extends approximately 270 degrees about cylindrical housing 36. Helical ramp portion 50 defines a helical flow path for dust-laden air entering air inlet chamber 48. The heavier dust particles will be centrifugally thrown against an inner surface 52 of cylindrical housing 36 whereby the heavier dust particles will be deposited in dust collection chamber 28. As indicated by the arrow at 54, the substantially cleaned air reverses its flow to enter air outlet chamber 46. Extending from air outlet chamber 46 is an outlet conduit 56 to which is secured a flexible hose 58.

Second and third stage dust collector 24 is shown in more detail in FIGS. 4–7. Dust collector 24 includes a housing 60 having a dust-laden air inlet conduit 62 and a clean air outlet conduit 64. A plurality of partitions 66, 68, and 70 affixed within housing 60 divide housing 60 into a dust collection chamber 72, a clean air outlet chamber 74, and an expansion chamber 76. Mounted within expansion chamber 76 is a second stage dust separator 78. In the preferred embodiment, second stage dust separator 78 is a cylindrical member formed of a substantially rigid material, for example, polyurethane. Dust separator 78 has an inlet end 80, an outlet end 82, and a continuous side wall 84 therebetween. Housing 60 has a top wall 86 with an aperture therein through which inlet conduit 62 extends. Affixed to top wall 86 within housing 60 is a tubular connector 88 to which inlet end 80 of dust separator 78 is secured. A gasket 90 is secured about inlet end 80 of dust separator 78 and tubular connector 88 by a pair of clamps 92. Clamps 92 are tightened to ensure a fluid-tight seal between tubular connector 88 and dust separator 78. Partition 68 has an aperture at 94 and a tubular connector 96 is affixed to partition 68 within aperture 94. Dust separator 78 is provided with an annular recess at 98 within which is received tubular connector 96. A clamp 100 is secured about outlet end 82 of dust separator 78. Clamp 100 generates a compressive force against an annular lip portion 102 at outlet end 82. In the preferred embodiment, the material of which dust separator 78 is formed will be slightly resilient at annular lip portion 102. Thus, when clamp 100 is tightened, lip portion 102 is compressed against tubular connector 96 ensuring an effective fluid-tight seal thereat.

Figure 8:
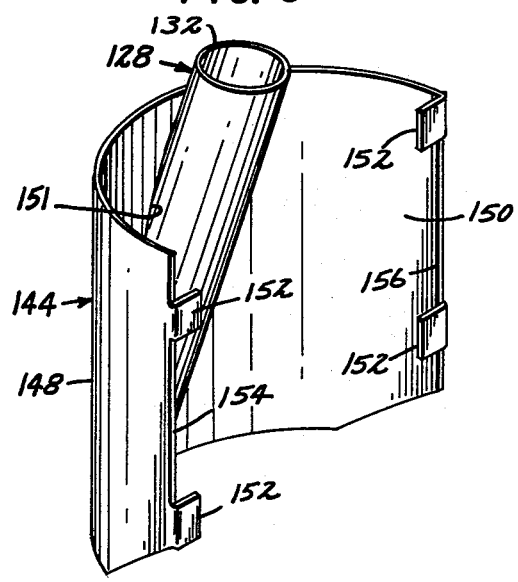
FIG. 8 is a view in perspective of the side outlet conduit member and mounting member of the present invention.
Figure 7:
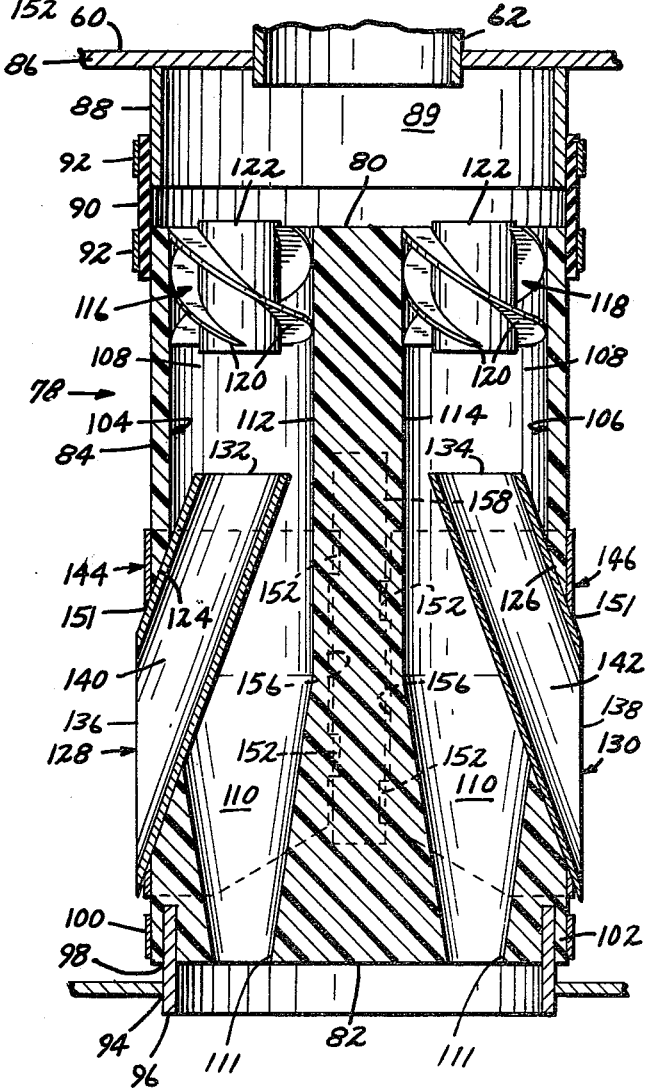
FIG. 7 is an enlarged sectional view of the side outlet separator of the present invention taken along line 7—7 of FIG. 6.

As shown in the sectional view of FIG. 7, dust separator 78 has a pair of axial passageways 104 and 106, each having an axis which is aligned parallel to the central axis of the cylindrical dust separator 78. Passageways 104 and 106 are spaced 180 degrees apart about the central axis of dust separator 78. It will be understood that more than two such axial passageways could be formed in dust separator 78 and that such additional passageways are contemplated within the spirit and scope of the present invention. Each axial passageway has a cylindrical portion as at 108 proximate inlet end 80, and a frusto-conical portion, as at 110, proximate outlet end 82. Axial passageways 104 and 106 have inner side walls 112 and 114, respectively. Positioned within axial passageways 104 and 106 proximate inlet end 80 are vortex generating devices 116 and 118, respectively. In the preferred embodiment, vortex generating devices 116 and 118 include a plurality of helical vanes 120 affixed to an elongated hub member 122. Vortex generating devices 116 and 118 are preferably press-fitted within axial passageways 104 and 106, respectively. Side wall 84 of dust separator 78 is provided with apertures 124 and 126 which provide fluid communication between axial passageways 104 and 106, respectively, and expansion chamber 76. A pair of conduit members 128 and 130 having inlet ends 132 and 134, and outlet ends 136 and 138, respectively, are received within apertures 124 and 126, respectively. Inlet ends 132 and 134 are positioned generally along the axis of axial passageways 104 and 106, and spaced apart from vortex generating devices 116 and 118. Conduit members 128 and 130, thus, define discharge passageways 140 and 142 between axial passageways 104 and 106 and expansion chamber 76. Conduit members 128 and 130 are affixed to mounting members 144 and 146. Mounting member 144 is illustrated in more detail in FIG. 8. Mounting member 144 will be described with reference to FIG. 8, it being understood that mounting member 146 is identical. In the preferred embodiment, mounting member 144 is a curved metal sheet having an outer surface 148, an inner surface 150 and a plurality of tabs, as at 152 projecting from edges 154 and 156. Mounting member 144 is designed to have a radius of curvature such that inner surface 150 conforms to the side wall 84 of dust separator 78. In the embodiment illustrated in the drawings, mounting member 144 is essentially semi-circular in cross-section. An aperture as at 151 is provided in mounting member 144 through which conduit member 128 extends. Conduit member 128 is affixed to mounting member 144 about aperture 151 and extends substantially upward and inward with respect to a central axis of dust separator 78 as shown in FIG. 7. Side wall 84 is provided with a pair of elongated slots 158 and 160 which receive tabs 152 that may be crimped into slots 158 and 160 to retain mounting members 144 and 146 in contact with side wall 84 and thereby secure conduit members 128 and 130 within apertures 124 and 126, respectively. It can be seen that axial passageways 104 and 106 provide fluid communication between input chamber 89 and dust collection chamber 72. As previously mentioned, conduit members 128 and 130 define discharge passageways 140 and 142 which provide fluid communication between axial passageways 104 and 106 and expansion chamber 76.

The third stage of three-stage collector 10 includes a pair of filters 160 and 162 mounted within expansion chamber 76 of housing 60. The structure of filter elements 160 and 162 will be described with particular reference to filter 160 since filter 162 is identical. Filter 160 has an inner tubular wall 164 which defines an axial passageway 166 communicating with clean air outlet chamber 74. Axial passageway 166 is closed at one end thereof by a base member 168. Filter 160 has an outer cylindrical wall 170 concentric with wall 164. Captured between walls 164 and 170 is an annular heavy-duty pleated paper cartridge filter element 172. Apertures 174 are provided in outer wall 170 while apertures 175 are also provided in inner wall 164. A filter support bracket 177 is affixed to partition 66 and filter 160 is secured thereto by a bolt 178 extending through an aperture in base member 168 and a wing nut 180. An annular sealing gasket 182 is affixed to a base 184 of filter 160. Fluid communication is provided between expansion chamber 76 and axial passageway 166 through apertured wall 170, filter element 172, and apertured wall 164. Filters 160 and 162 are mounted within expansion chamber 76 such that their axes are orthogonal with respect to the central axis of dust separator 78. As shown in particular in FIG. 6, the axes of filters 160 and 162 lie in parallel vertical planes. Further, FIG. 5 illustrates a tubular connection 186 between clean air outlet chamber 74 and an indicating device 188. Indicating device 188 provides an indication of the restriction caused by dust collecting in filter element 172. When the indication reaches a certain predetermined value the filter elements may be removed and cleaned. Indicating device 188 and its operation is described in greater detail on page 15 of the Donaldson Company operation manual referred to above.

The operation of the present invention will now be described with particular reference to the function of second stage dust separator 78. Dust generated by roof drill 14 is collected by hollow drill bit 20 and directed through a vacuum intake hose 16 to inlet conduit 42 of cyclone separator 34. Dust-laden air enters inlet chamber 48. Helical ramp portion 50 imparts a helical flow component to the dust-laden air whereby the heavier dust particles are centrifugally thrown against inner surface 52 and deposited in dust collection chamber 28. The substantially cleaned air enters air outlet chamber 46 and is fed through outlet conduit 56 and flexible hose 58 to inlet conduit 62 of second and third stage dust collector 24. First dust collector 22 removes approximately 95 percent or more of the dust entrapped in air entering chamber 48.

The air travels through conduit 62 into inlet chamber 89 of second stage dust separator 78. The air enters axial passageways 104 and 106 where a vortex is generated in the flow by helical vanes 120. The operation of dust separator 78 will be described with reference to axial passageway 104, it being understood that the operation of axial passageway 106 is identical. With the vortex flow generated within axial passageway 104, dust particles are centrifugally thrown against inner side wall 112 and are discharged through frusto-conical portion 110 into dust collection chamber 72. The frusto-conical shape of axial passageway portion 110 increases the vortex strength proximate outlet end 82 of separator 78 such that dust will not clog aperture 111. Clean air is collected by conduit member 128 and is discharged from inlet end 132 through passageway 140 and outlet end 136 into expansion chamber 76. As previously mentioned, axial passageways 104 and 106 are disposed 180 degrees apart circumferentially about the central axis of separator 78. The clean air is thus discharged from separator 78 in opposite directions with respect to the central axis of the separator. As described in the copending U.S. application assigned to the assignees of the present invention, side outlet separator 78 combines the advantages of high flow rates and efficiency of the prior art straight-through axial cyclone separators with the non-scavenge flow characteristics of a reverse flow cyclone separator. Additionally, these advantages are achieved in a reduced size package than the prior art straight-through cyclone separator or the prior art reverse flow cyclone separator such that in a housing of similar size as the prior art three-stage collector disclosed in the Donaldson Company operator manual discussed above, a pair of third stage filters 160 and 162 can be utilized as opposed to a single filter thereby increasing the efficiency of the third stage.

Air entering expansion chamber 76 will be drawn into filters 160 and 162 passing through the annular filter elements, such as 172, into the axial passageways therein, for example, 166. Additional dust will be collected in filters 160 and 162 and the air entering outlet chamber 74 will be on the order of 99.9 percent free of dust particles. The clean air may then be discharged into the atmosphere through vacuum blower 18.

It will be understood that alternative embodiments of first dust collector 22 and filters 160 and 162 are contemplated within the spirit and scope of the present invention. Additionally, while separator 78 is disclosed as cylindrical, it will be understood that alternative configurations would be adequate and that alternative vortex generating structures other than helical vane devices would be equally effective in the present invention.

From the above description, it will be apparent that the present invention is an improved three-stage dust collector incorporating a side outlet dust separator in the second stage. The second stage side outlet separator combines the advantages of the prior art straight-through axial cyclone separator and the reverse-flow cyclone separator in a single smaller sized device. The smaller packaging of the second stage permits the use of two as opposed to one filter element in the third stage in a housing which is sized the same as the prior art three-stage dust collector, thus improving the efficiency of the third stage and lengthening the time between replacement and/or cleaning of the third stage filter elements, resulting in less down time of the apparatus.

What is claimed is:

1. A three-stage dust collector having a first dust separator and a third dust separator, a second dust separator connected in fluid communication between said first and third dust separators, said second dust separator formed of a block of material having an inlet end and an outlet end spaced apart along a longitudinal axis, a continuous side wall between said inlet and said outlet ends, said side wall having a plurality of side outlet apertures disposed intermediate said inlet and said outlet ends, said second separator having a plurality of passageways between said inlet end and said outlet ends thereof, said passageways having axes aligned generally parallel to said longitudinal axis, said passageways being disposed within said block of material so that said block of material surrounding and defining said axial passageway is relatively thick measured in a direction generally radially with respect to said axes of said axial passageways and as compared to the inside diameter of said axial passageways, said second dust separator further comprising:
(a) vortex generating means affixed within each of said axial passageways at said inlet ends thereof whereby a circular flow component is imparted to the axial flow of dust-laden air such that dust particles are centrifugally thrown toward the surface of said axial passageway to exit through said outlet end of said separator; and
(b) means disposed within said second separator for channeling substantially clean air from each axial passageway through one of said side outlet apertures, said second dust separator connected to said third dust separator so that said substantially clean air is directed from said second to said third dust separator.

2. A three-stage dust collector in accordance with claim 1 wherein said means for channeling substantially clean air from said axial passageway through said side outlet aperture further comprises a conduit member having a continuous side wall defining a passageway between an inlet end disposed within said axial passageway proximate said inlet end of said second dust separator and an outlet end terminating outwardly of said aperture in said side wall.

3. A three-stage dust collector in accordance with claim 2 wherein said side wall is provided with elongated slots and said second separator further comprises conduit mounting members having apertures therein through which said outlet end of said conduit members extend, said conduit member being affixed to said mounting member at said outlet end thereof, said mounting member having an inner surface constructed to conform to said outer surface of said side wall, and having tabs projecting therefrom which engage within said elongated slots to secure said conduit member to said second dust separator.

4. A three-stage dust collector in accordance with claim 3 wherein said second dust separator is cylindrical having inlet and outlet ends spaced apart along its central axis and wherein said plurality of axial passageways and said plurality of apertures include a pair of passageways and apertures, respectively, spaced 180 degrees circumferentially about said central axis.

5. A three-stage dust collector in accordance with claim 4 said axial passageways further comprise a first cylindrical portion proximate said inlet end of said second dust separator and a second frustro-conical portion proximate said outlet end of said second dust separator.

6. A three-stage dust collector in accordance with claim 4 wherein said vortex generating means further comprises a plurality of helical vanes.

7. A three-stage dust collector comprising:
(a) a first dust separator comprising a cyclone separator having an inlet for dust-laden air, an air outlet, a dust outlet, and a first dust collection chamber connected to the dust outlet;
(b) a housing, said housing having a plurality of partitions secured therein to divide the interior of said housing into an expansion chamber, a second dust collection chamber, and a clean outlet chamber;
(c) a side outlet separator mounted within said housing and comprising
  (i) a block of material having first and second ends joined by a continuous wall and defining a longitudinal axis;
  (ii) a plurality of axial passageways formed through the block of material between said first and second ends, each passageway having an axis generally parallel to the axis of said block;
  (iii) each passageway having an air inlet at said first end and a dust-laden air outlet at said second end;
  (iv) said axial passageways disposed within said block of material so that said block of material surrounding and defining said axial passageways is relatively thick measured in a radial direction with respect to the axes of said axial passageways and as compared to the inside diameter of said axial passageways;
  (v) vortex generating means within each passageway at said air inlet;

(vi) at least one side outlet aperture for each passageway formed in the wall of said block of material;

(vii) and means disposed within each of said axial passageways for channeling clean air from the associated axial passageway through the associated side outlet aperture;

(d) intake means connected between said air outlet of said cyclone separator and the air inlets of said side outlet separator, said axial passageways in said side outlet separator providing fluid communication between the air inlets of the side outlet separator and said second dust collection chamber, while said channeling means provide fluid communication between said axial passageways and said expansion chamber;

(e) and first filter means mounted within said expansion chamber between the side outlet apertures and the clean air outlet chamber for providing filtered fluid communication therebetween.

8. A three-stage dust collector in accordance with claim 7 wherein said channeling means further comprises a conduit member having a continuous side wall defining a passageway between an inlet end diposed within each of said axial passageways and an outlet end terminating outwardly of said side outlet apertures.

9. A three-stage dust collector in accordance with claim 7 wherein said side outlet separator is formed of substantially rigid yet somewhat resilient material and further comprising means for mounting said separator within said housing, said mounting means further comprising:

(a) means defining an annular recess in the outlet end of said side outlet separator;

(b) a tubular connector received within said annular recess, said tubular connector providing the passageway between said outlet end of said side outlet separator and said second dust collection chamber; and (c) clamp means secured about said outer surface of said side wall at said outlet end of said side outlet separator, said clamp means securing said tubular connector within said annular recess.

10. A three-stage dust collector comprising:

(a) a first dust separator comprising a cyclone separator having an inlet for dust-laden air, an air outlet, a dust outlet and a first dust collection chamber connected to the dust outlet;

(b) a housing having a plurality of partitions secured therein to divide the interior thereof into an expansion chamber, a second dust collection chamber and a clean outlet chamber;

(c) a side outlet separator mounted within said housing comprising (i) first and second ends joined by a continuous side wall and defining a longitudinal axis;

(ii) a plurality of axial passageways between said first and second ends and each having an axis generally parallel to said longitudinal axis;

(iii) each passageway defining an air inlet at said first end and a dust-laden air outlet at said second end;

(iv) vortex generating means affixed within each of said axial passageways at said air inlet;

(v) at least one side outlet aperture for each axial passageway;

(vi) a conduit member disposed within each of said axial passageways having a continuous side wall defining a clean air outlet passageway between an inlet end disposed within the associated axial passageway and an outlet end terminating at the associated side outlet aperture;

(vii) and mounting members to which said conduit members are affixed, said mounting members being adapted to conform generally to the outer surface of said continuous side wall and affixed thereto, thereby securing said conduit members whithin said axial passageways, each of said conduit members serving to channel clean air from the associated axial passageway through said side outlet aperture;

(d) intake means connected between the air outlet of said cyclone separator and the air inlets of said side outlet separator, said axial passageways and said side outlet separator providing fluid communication between said intake means and said second dust collection chamber while said conduit members provide fluid communication between said axial passageways and said expansion chamber; and (e) filter means mounted within said expansion chamber between the side outlet apertures and th clean air outlet chamber for providing filtered fluid communication therebetween.

11. A three-stage dust collector in accordance with claim 10, wherein said axial passageways further comprise a first substantially cylindrical portion proximate said inlet end and a second frusto-conical portion proximate said outlet end of said side outlet separator and wherein said vortex generating means further comprises a plurality of helical vanes.

12. A three-stage dust collector in accordance with claim 10 wherein said side wall of said side outlet separator has a plurality of elongated slots that lie generally parallel to said longitudinal axis of said side outlet separator, and wherein said mounting members have tabs affixed thereto which are received within said elongated slots to secure said mounting members to said side outlet separator.

13. A three-stage dust collector comprising:

(a) a first dust separator comprising a cyclone separator having an inlet for dust-laden air, an air outlet, a dust outlet and a first dust collection chamber connected to the dust outlet;

(b) a housing having a plurality of partitions secured therein to divide the interior of said housing into an expansion chamber, a second dust collection chamber and a clean air outlet chamber;

(c) a side outlet separator comprising (i) a cylindrical block of substantially rigid material having first and second ends joined by a continuous wall and defining a central longitudinal axis;

(ii) a pair of axial passageways formed through the cylindrical block of material between said first and second ends, each passageway having an axis generally parallel to said central longitudinal axis;

(iii) each passageway having an air inlet at said first end and a dust-laden air outlet at said second end;

(iv) a pair of side outlet apertures formed in said cylindrical block intermediate the first and second ends thereof, said pair of side outlet apertures and said axial passageways disposed 180 degrees apart circumferentially about said central longitudinal axis;

(v) vortex generating means affixed within each of said axial passageways at said air inlet;

(vi) means disposed within said axial passageways for channeling clean air from said axial passageways through said side outlet apertures;

(vii) said cylindrical block of material having a pair of elongated slots in the outer surface thereof which are elongated generally in the direction of the central longitudinal axis and circumferentially spaced 180 degrees apart about said cylindrical longitudinal axis;

(viii) a pair of mounting members substantially semicircular in cross section and each having a radius of curvature such that the mounting members conform to the outer surface of said cylindrical block, each of said mounting members having an aperture through which said channeling means extends, said channeling means affixed to said mounting member and extending generally upward toward the air inlet of the associated axial passageway and inward toward said central longitudinal axis of the cylindrical block, and said channeling means having a continuous side wall defining a discharge passageway between inlet and outlet ends thereof;

(ix) and a plurality of tabs affixed to said mounting members exposed to engagement in said elongated slots such that said channeling means are secured within said axial passageways;

(d) intake means connected between the outlet of said cyclone separator and the air inlets of said side outlet separator, said axial passageways in said side outlet separator providing fluid communication between said intake means and said second dust collection chamber while said channeling means provide fluid communication between said axial passageways and said expansion chamber;

(e) and first filter means mounted within said expansion chamber between the side outlet apertures and the clean air outlet chamber for providing filtered fluid communication therebetween.

14. A three-stage dust collector in accordance with claim 13 wherein said axial passageways further comprise a first substantially cylindrical portion proximate said inlet end of said side outlet separator and a second frusto-conical portion proximate said outlet end of said side outlet separator, and wherein said vortex generating means further comprises a plurality of helical vanes.

15. A three-stage dust collector in accordance with claim 14 further comprising a second filter means mounted within said expansion chamber, each of said first and second filter means having an inner tubular passageway opening into said clean air outlet chamber, and an annular filter element providing filtered fluid communication between said expansion chamber and said tubular passageway.

* * * * *